(12) United States Patent
Turner et al.

(10) Patent No.: US 12,499,455 B2
(45) Date of Patent: Dec. 16, 2025

(54) SYSTEM AND METHOD FOR CUSTOMER PREMISE EQUIPMENT (CPE) THEFT OF SERVICE (TOS) DETECTION AND PREVENTION

(71) Applicant: Charter Communications Operating, LLC, St. Louis, MO (US)

(72) Inventors: Christopher G. Turner, Aurora, CO (US); Jason S. Page, Denver, CO (US); Robert Hulshof, Highlands Ranch, CO (US); James H. Alexander, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 202 days.

(21) Appl. No.: 17/469,950

(22) Filed: Sep. 9, 2021

(65) Prior Publication Data
US 2023/0071425 A1 Mar. 9, 2023

(51) Int. Cl.
G06Q 30/018 (2023.01)
G06Q 30/0201 (2023.01)
H04B 17/309 (2015.01)
H04H 20/71 (2008.01)

(52) U.S. Cl.
CPC ..... *G06Q 30/0185* (2013.01); *G06Q 30/0201* (2013.01); *H04B 17/309* (2015.01); *H04H 20/71* (2013.01)

(58) Field of Classification Search
CPC .......... G06Q 30/0185; G06Q 30/0201; G06Q 10/06395; G06Q 10/00; G06Q 10/02; G06Q 10/06; G06Q 10/10; G06Q 30/02; H04B 17/309; H04H 20/71; H04H 60/31; H04H 60/66; G05B 2219/31357; H04N 7/106; H04N 21/442; H04N 21/4524; H04N 21/25816; H04N 21/2408; H04N 21/2541

See application file for complete search history.

(56) References Cited

U.S. PATENT DOCUMENTS

| | | | |
|---|---|---|---|
| 7,315,826 B1 * | 1/2008 | Guheen | G06Q 30/0201 705/7.29 |
| 7,995,994 B2 | 8/2011 | Khetawat et al. | |
| 8,554,667 B2 * | 10/2013 | Choudhuri | G06Q 40/02 705/40 |
| 9,578,620 B2 | 2/2017 | Krening et al. | |

(Continued)

OTHER PUBLICATIONS

Eldering, Customer Premises Equipment for Residential Broadband Networks, Jun. 1997, IEEE Communications Magazine, vol. 35, Issue 6, pp. 114-121 (Year: 1997).*

*Primary Examiner* — Robert D Rines
(74) *Attorney, Agent, or Firm* — The Marbury Law Group, PLLC

(57) ABSTRACT

Systems and methods for evaluating a customer premise equipment (CPE) device to determine whether it is being used to perpetuate theft of service (TOS). A computing system may be configured to collect raw data from a customer premise equipment (CPE) device associated with a subscriber account, determine TOS features based on the collected raw data, determine a risk score for the CPE based on the TOS features, determine whether the risk score exceeds a threshold value, and classifying the CPE device as a TOS device in response to determining that the risk score exceeds the threshold value.

12 Claims, 15 Drawing Sheets

(56) References Cited

U.S. PATENT DOCUMENTS

| | | | | |
|---|---|---|---|---|
| 9,788,149 B2* | 10/2017 | Stern | ............ | H04W 4/33 |
| 2002/0074402 A1* | 6/2002 | Latimer | ............ | G06K 7/10861 |
| | | | | 235/454 |
| 2004/0193476 A1* | 9/2004 | Aerdts | ............ | G06Q 30/0201 |
| | | | | 705/7.29 |
| 2007/0076705 A1* | 4/2007 | Semon | ............ | H04L 12/66 |
| | | | | 370/389 |
| 2008/0134274 A1* | 6/2008 | Derrenberger | ..... | H04N 21/4367 |
| | | | | 348/E7.069 |
| 2008/0201785 A1* | 8/2008 | Overcash | ............ | H04N 21/6168 |
| | | | | 726/35 |
| 2010/0131971 A1* | 5/2010 | Hegglin | ............ | H04L 63/1416 |
| | | | | 725/25 |
| 2011/0131123 A1* | 6/2011 | Griffin | ............ | G06Q 40/08 |
| | | | | 705/35 |
| 2012/0198489 A1* | 8/2012 | O'Connell | ............ | G06Q 30/06 |
| | | | | 725/14 |
| 2013/0174192 A1* | 7/2013 | Lee | ............ | H04N 21/25841 |
| | | | | 725/25 |
| 2014/0300344 A1* | 10/2014 | Turner | ............ | G01R 21/133 |
| | | | | 324/107 |
| 2015/0208195 A1* | 7/2015 | Kariman | ............ | H04W 4/02 |
| | | | | 455/456.1 |
| 2016/0105703 A1* | 4/2016 | Bacon | ............ | H04N 21/2541 |
| | | | | 725/25 |
| 2016/0252893 A1* | 9/2016 | Kamyshnikov | ...... | G06Q 20/108 |
| | | | | 700/231 |
| 2017/0285081 A1* | 10/2017 | Silverman | ............ | H02J 3/381 |
| 2017/0292999 A1* | 10/2017 | Turner | ............ | G01R 31/62 |
| 2018/0252758 A1* | 9/2018 | Turner | ............ | G01R 19/16538 |
| 2018/0367852 A1* | 12/2018 | Bernstein | ............ | H04N 7/106 |
| 2019/0342613 A1* | 11/2019 | Gutterman | ............ | H04N 17/004 |

* cited by examiner

SYSTEM AND METHOD FOR CUSTOMER PREMISE EQUIPMENT (CPE) THEFT OF SERVICE (TOS) DETECTION AND PREVENTION

BACKGROUND

A theft of service (TOS) occurs when a person or entity obtains access to a resource or service (e.g., cable programming, bandwidth, network access, Internet Protocol (IP) services, etc.) without lawfully compensating the service provider for the use of those resources or services. Often, TOS is perpetuated by nefarious actors through unauthorized or illegitimate devices, or though unauthorized use of legitimate devices. For example, some service providers (e.g., cable companies, etc.) charge subscribers for each premise, residence, household, or dwelling (herein "premise"). The service provider may charge a larger fee for the first CPE or set-top box (STB) in a premise, and a much smaller additional fee for each additional CPEs/STBs that is deployed in that same premise. This provides, for example, a cost effective way for a subscriber with multiple TVs inside the same house to receive cable programming on each TV inside the house. However, this also provides nefarious actors the opportunity to request additional CPEs/STBs, and distribute the additional CPEs/STBs to others (their friends, neighbors, etc.) for use at unauthorized premises at a reduced or no cost. In some instances, the additional CPE/STB may be used at another location without the knowledge of the authorized user.

The addition of such unauthorized use of the otherwise legitimate devices may cause network congestion and/or consume a significant amount of limited network resources (e.g., network bandwidth, etc.) without compensating the service provider for the use of those resources. Accordingly, new and improved solutions that better identify and respond to unauthorized use of legitimate devices will be beneficial to internet service providers, cable companies, multiple-system operators (MSO) and the consumers of their services.

SUMMARY

The various aspects include methods of identifying a theft of service (TOS), which may include collecting data from a customer premise equipment (CPE) device associated with a subscriber account, determining TOS features based on the collected data, determining a risk score for the CPE based on the TOS features, determining whether the risk score exceeds a threshold value, and classifying the CPE device as a TOS device in response to determining that the risk score exceeds the threshold value.

In some aspects, collecting data from the CPE device associated with the subscriber account may include collecting neighbor data, premise details, RF broadcast values, timing offset values, or pre-equalizer settings. In some aspects, collecting data from the CPE device associated with the subscriber account may include activating a radio frequency (RF) radio to broadcast a signal in at least one of a plurality of CPE devices associated with a subscriber account, activating receiver circuitry in one or more of the plurality of CPE devices, determining whether the activated receiver circuitry was able to receive the broadcast signal, and determining an RF broadcast value based on whether the activated receiver circuitry was able to receive the broadcast signal.

In some aspects, the method may include determining signal characteristics of the broadcast signal received in one or more of the plurality of CPE devices, in which determining the RF broadcast value based on whether the activated receiver circuitry was able to receive the broadcast signal further includes determining the RF broadcast value based on whether the activated receiver circuitry was able to receive the broadcast signal and the determining signal characteristics. In some aspects, determining the signal characteristics of the broadcast signal received in one or more of the plurality of CPE devices may include determining a signal strength of the received broadcast signal, a signal-to-noise ratio of the received broadcast signal, or distortions or degradation in the received broadcast signal.

In some aspects, the method may include taking a responsive action in response to classifying the CPE device as a TOS device. In some aspects, taking the responsive action in response to classifying the CPE device as a TOS device may include deactivating the CPE device, or sending a notification to a subscriber associated with the subscriber account.

Further aspects may include a computing device or system having a processor configured with processor-executable instructions to perform various operations corresponding to the methods discussed above. Further aspects may include a non-transitory processor-readable storage medium having stored thereon processor-executable instructions configured to cause a computing device processor to perform various operations corresponding to the method operations discussed above. Further aspects may include a computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
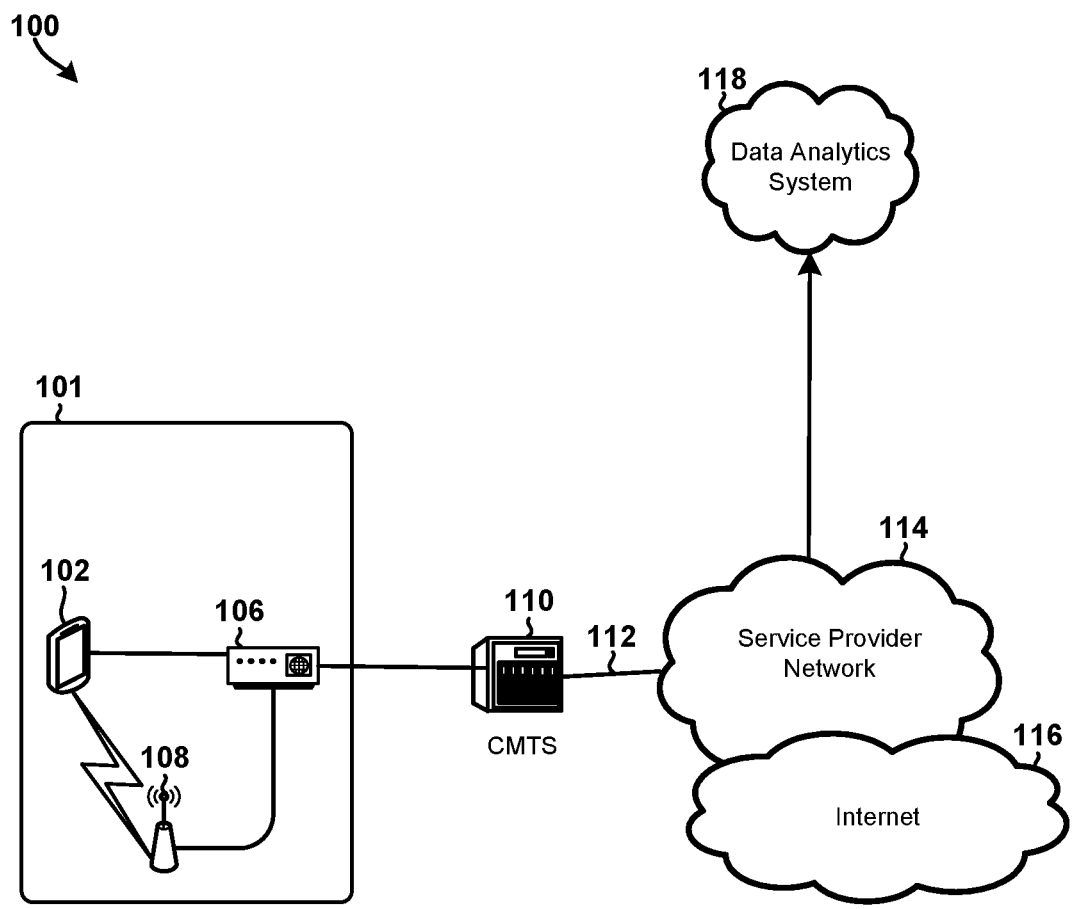
FIGS. 1A and 1B are a system block diagram illustrating an example communications system suitable for use by various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods (and computing systems configured to implement the methods) for detecting and preventing theft of service (TOS) that occurs though the unauthorized use of customer premise equipment (CPE), such as set-top-boxes (STBs).

Some embodiments may include a computing system that is configured to determine whether CPEs provisioned to a single account and/or that are authorized for use at a specific premise are co-located within the same premise (i.e., the boundaries of the authorized premise). As an example, in some embodiments, the computing system may determine whether a STB that is authorized for use in one home is actually being used in an another home.

By identifying, responding to, and/or preventing TOS, the various embodiments may improve the performance, efficiency and functioning of the service provider network and the components/devices that are included in, utilize, or benefit from the service provider network. For example, by shutting down unauthorized STBs, the embodiments may reduce network congestion and/or network resource (e.g., network bandwidth, etc.) consumption. This may in turn improve the performance of the service provider network and the services received by the consumers.

The term "service provider network" is used generically herein to refer to any network suitable for providing consumers with access to a digital video delivery system, the Internet, or IP services over radio frequency (RF) cable or broadband connections. Service provider networks may encompass both wired and wireless networks/technologies. Examples of wired network technologies and networks that may be included within a service provider network include cable networks, fiber optic networks, hybrid fiber-coaxial networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-135/TDMA), evolution-data optimized (EV-DO), digital enhanced cordless telecommunications (DECT), Worldwide Interoperability for Microwave Access (WIMAX), wireless local area network (WLAN), personal area network (PAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages. Any references to terminology and/or technical details related to an individual wired or wireless communications standard or technology are for illustrative purposes only, and not intended to limit the scope of the claims to a particular communication system or technology unless specifically recited in the claim language.

A service provider network may be divided into nodes that each encompass an area and/or are associated with a headend. Network-level solutions that analyze and compare information collected from CPE devices included within the same network node and/or serviced by the same headend may be referred to herein as "intra-node" solutions. Network-level solutions that analyze and compare information collected from CPE devices that are in different nodes or headends may be referred to herein as "inter-node" solutions.

The term "computing system" may be used generically herein to refer to any electronic device that includes a programmable processor, memory and circuitry for providing the functionality described herein. As such, a computing system may include any one or all of set-top-boxes (STBs), modems, routers, network switches, network bridges, residential gateways (RG), access nodes (AN), bridged residential gateway (BRG), fixed mobile convergence products, home networking adapters and Internet access gateways that enable consumers to access communications service providers' services, satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (for example, ROKU™), smart televisions, digital video recorders (DVRs), and similar electronic devices which include a programmable processor and memory and circuitry for providing the functionality described herein.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

In order to improve efficiency, some residential buildings may share a common foundation, roof, etc, but may support multiple residences. For example, a duplex may be a multifamily home that has two units in one building. In some instance, a single dwelling may have multiple individuals living within a premise. For example, a single building may be sub-divided into individual apartments. In many such instances, each individual or family that lives in such conditions maintain separate utility costs for each home (premise). Such separate utilities may include bandwidth, video service subscriptions, network access, Internet Protocol (IP) services, etc.

A theft of service (TOS) occurs when a person or entity obtains access to a resource or service (e.g., digital video services, bandwidth, network access, Internet Protocol (IP) services, etc.) without lawfully compensating the service provider for the use of those resources or services. TOS attacks may be perpetuated by nefarious actors through a variety of different types of unauthorized or illegitimate devices. TOS may also be perpetuated though unauthorized use of legitimate devices.

For example, some service providers (e.g., cable companies, etc.) charge subscribers on an account basis and/or for each premise. The service provider may charge a larger fee for the first CPE in an authorized premise, and a much smaller additional fee for each additional CPE that is deployed in that same premise. The fees for the additional CPEs typically only cover the costs of those units, and do not provide the service provider with adequate compensation to recover costs associated with the provisioning of services. The additional CPEs are provided mainly as a courtesy to the subscriber. The additional CPEs allow, for example, a subscriber with multiple TVs inside the same premise to receive cable programming on all of the TVs that are inside the same premise. As such, service providers rely on the larger fees collected for activating a service and providing the first CPE (e.g., set-top-box) on each account to recover their operating and equipment costs, to update and expand their network infrastructures, and/or receive adequate compensation for the use of the services and resources. For these and other reasons, it is important to identify and prevent TOS that occurs from CPEs/STB s being used at unauthorized premises.

Preventing TOS is a challenging problem for service providers. This is due, in part, to the characteristics of service provider networks. For example, each service provider network may include a multitude of CPEs (STBs, etc.) that may be distributed throughout a neighborhood and/or across many different large geographical areas. As such, prevention of TOS may be labor intensive and/or may require physical access to the areas in which the CPE may be located to confirm each CPE/STB is in an authorized location. Such solution may be extremely time consuming and/or cost prohibitive. On the other hand, network-level solutions that allow for remotely analyzing a multitude of subscriber accounts and/or a large number of CPEs distributed across large geographical areas are much more feasible, as they have the potential to be faster, more efficient, and more cost effective than the other existing or conventional solutions.

As mentioned above, network-level solutions may be categorized as "inter-node" or "intra-node" solutions. Some inter-node solutions may be used to determine whether a CPE that is authorized for use at a first premise is being used at an unauthorized second premise, but only if the first premise and second premise are far apart (e.g., across town and/or associated with a different headend/node, etc.). As such, inter-node solutions, alone, may be ineffective or inadequate for locating the CPE devices or identifying TOS when the authorized CPE and the TOS CPE are being used in close proximity (e.g., within the same apartment building, same neighborhood, etc.).

The various embodiments may provide, implement or use network level intra-node solutions, network level inter-node solutions, or a combination thereof for controlling or limiting CPE operation based on the specific real-world addresses in which the CPEs are located.

Some embodiments may include components that may be configured to collect, analyze, and/or compare real world phenomena (e.g., measurements related to matter, energy, time, etc.) from the CPEs associated with a single subscriber or account. Embodiments may use the results of the analysis and/or comparisons to determine the likelihood that the CPEs are being used within the same premise.

In some embodiments, the computing system may be configured to collect, analyze, compare, determine, implement, use, etc. several different real world phenomena and/or several different detection methods to determine or compute a probability that a CPE device is being used in an unauthorized premise to perpetuate a TOS.

For example, there are certain types of information available from CPEs at the network level. This data is affected by real world phenomena, which should be located and concentrated in one premise. In addition, each premise should have different natural phenomena that may impact or degrade some of the data in a distinct way. By comparing and contrasting the effects of such phenomena on data collected from different CPEs, components configured in accordance with the embodiments may determine whether two CPE are indeed located in the same premise.

In some embodiments, the components may be configured to use some of the telemetry points that are "baked in" the DOCSIS protocol to determine the distances between each STB associated with a subscriber or account and the cable modem termination system (CMTS) in the backend. By evaluating the differences between the CPEs that should be in the same premise, the components may ensure that the distances between the CPEs are within a reasonable range of expectations. For example, if two CPEs appear to be hundreds of feet apart, then the components may determine that the CPEs are not inside of the same premise with a high degree of confidence.

In some embodiments, the components may be configured to determine whether the CPEs are inside the same premise based on DOCSIS upstream pre-equalizer settings. Generally, these pre-equalizer settings may be impacted by conditions and factors within their environment, such as extra length in cable, impairments from amplifiers, splitters, damaged cables, loosely connected connectors, etc.

In some embodiments, the components may be configured to identify correlations, overlaps, and differences these phenomena or their impacts the pre-equalizer settings of the CPEs, and determine whether the CPEs are inside the same premise based on whether these correlations, overlaps, and differences fall within an expected range.

In some embodiments, the components may be configured to distinguish RF noise patterns to determine if CPEs are co-located inside the same premise.

Many CPEs include wireless radios. For example, STBs may include a wireless radio that allows the STBs to communicate with remote controllers. In some embodiments, the components may be configured to use these wireless radios to determine whether CPEs that should be co-located within the same premise are able to communicate with one another. For example, the components may cause the CPEs to broadcast and/or listen for a specific signal, and to report back to a server whether they were able to detect the presence of the signal. In instances in which all the other CPEs associated with the account are indeed located within the same premise, they should all report back that they received detected signal. In instances in which a CPE does not report that it received the signal, it is likely outside of wireless radio range from the other CPE devices. In instances in which it is out of wireless radio range, then there is a high probability that the CPE device is not located within the same premise as the others.

Figure 1B:
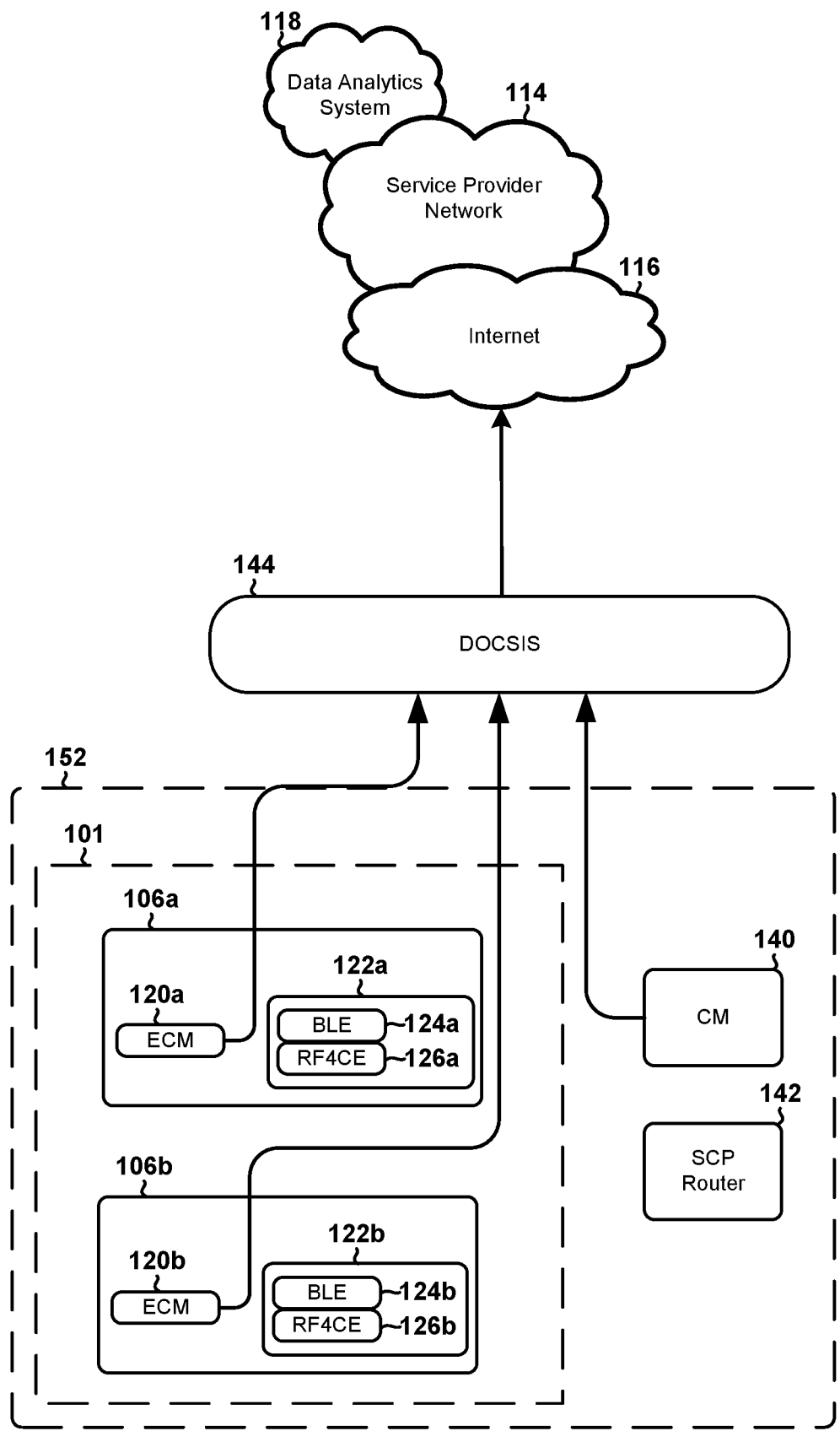

FIGS. 1A and 1B are simplified examples of a network 100 that may be used to implement the various embodiments. In the example illustrated in FIG. 1A, the network 100 includes a local area network (LAN) 101 that includes user equipment (UE) 102 devices, a customer premise equipment (CPE) 106 component/device, and a wireless extender or access point 108. The UE 102 devices may be coupled to the CPE 106 component/device via wired and/or wireless communication links. The CPE 106 may include a cable modem (CM) that is coupled to a digital subscriber line access multiplexer (DSLAM) or a cable modem termination system (CMTS) 110. The cable modem (CM) in the CPE 106 component/device may be a network bridge that provides bi-directional data communication via radio frequency channels on a hybrid fiber-coaxial (HFC) and/or radio frequency over glass (RFoG) infrastructure.

The service provider network 114 may include and/or may be coupled to a data analytics system 118 suitable for analyzing and storing information. The service provider network 114 may also include various network components for providing consumers with access via wired or wireless connection 112 to the Internet 116 or IP services over broadband connections. For example, the service provider network 114 may include a subscriber management component configured to store subscriber information and/or perform various subscription management operations, a policy component configured to determine and/or enforce various rules and policy decisions, a datacenter component, a virtual machine component, etc.

The CMTS 110 may be deployed in a headend or hubsite which serves thousands of homes or LANs 101. The CMTS 110 may be configured to facilitate high speed communications between the CPE 106 and the components within a service provider network 114, which allow the UE 102 devices to send and receive information to and from the Internet 116.

Often, the upstream communication signals between a CPE 106 and CMTS 110 experience variations. The received signal is typically different than the sent signal sent. The difference is sometimes slight, and sometimes significant. The pre equalizer logic attempts to compensate for these variations between the sent and received signals, such as by modifying the signal sent so the that the received signal is a close as possible to the intended signal.

As a further example, the CPE 106 may transmit a main RF signal in the upstream path towards the CMTS 110. As the signal propagates through the coaxial cable, the signal experiences a coupling loss, impedance mismatch, micro-reflection, etc. As a more detailed example, corrosion on a center seizure screw where the coax cable enters an RF amplifier or a physical tap may cause some of the RF energy from the CPE 106 to propagate on the downstream and hit a different physical tap, and eventually be reflected back towards the CMTS 110. Accordingly, the CMTS may receive an impaired signal that includes both the main signal and the reflected signal.

To mitigate against such impairments, the CMTS 110 may be configured to evaluate the communication signals received from the CPE 106 to determine whether the signal is impaired and/or identify the cause (e.g., tilt, roll-off, in-channel standing waves, etc.) of an impairment (e.g., micro-reflections, group delay, etc.). The CMTS 110 may periodically inform or instruct the CPE 106 to pre-distort its signal to cancel out the effects of that impairment. For example, the CMTS 110 may instruct the CPE 106 to send a modified signal so that when pre-equalization data from the CPE 106 is received by the CMTS 110, the signal is much closer to an ideal signal.

In some embodiments, the system 100 may also include DOCSIS proactive network maintenance (PNM) component (not illustrated separately in FIG. 1A) that allows the service provider to identify faults before service is impacted for the subscriber. The PNM component may use pre-equalization data from CPEs 106 to identify upstream impairments (e.g., micro-reflections, group delay, etc.) that could impact service. The PNM component may evaluate the pre-equalization coefficients to identify the CMTS 110 components that include CPE 106 devices that are compensating for impairments like micro-reflections and group delay. Said another way, a CMTS 110 may inform or instruct a CPE 106 to distort (or pre-distort) its signal to cancel out the effects of an impairment, and a PNM component may identify the CMTS 110 components that include CPE 106 devices that are compensating for impairments.

As mentioned above, a single CMTS 110 may serve thousands of homes, LANs 101 or CPEs 106. Many service providers have visibility into the CMTS 110, but not the individual CPEs 106. In addition, the same signal is received by all the devices in the node. For these and other reasons, it may challenging to identify the physical locations of specific CPEs 106 serviced by a CMTS 110 (e.g., based solely on the physical location of the CMTS 110, etc.).

FIG. 1B illustrates a system 152 that includes two CPEs 106a-b that are located in close proximity, within a customer premise, or within the same LAN 101. Each of the CPEs 106a, 106b may include an embedded cable modem (ECM) 120a, 120b, which may be a network bridge that provides bi-directional data communication via radio frequency channels on a HFC and/or RFoG infrastructure. Each of the CPEs 106a, 106b may also include one or more wireless radios 122a, 122b, such as the illustrated Bluetooth Low Energy (BLE) 124a, 124b and a RF4CE 126a, 126b radios. It should be understood that the wireless radios 122a, 122b or CPEs 106a, 106b may include other similar wireless and/or short range communication radios, techniques, or technologies, such as Zigbee, Adaptive Network Topology (ANT), RFID, LoRa or other similar low-power wide-area network modulation techniques, DASH7 Alliance Protocol (D7A), NFC, OMA Lightweight M2M (LwM2M), and others.

In the example illustrated in FIG. 1B, each ECM 120a, 120b is coupled to a data-over-cable service interface specifications (DOCSIS) network 144, which provides access to the Internet 116, service provider network 114 and/or data analytics system 118. Briefly, in DOCSIS networks, a cable modem (e.g., ECM 120a, 120b) establishes IP connectivity by requesting a lease from a dynamic host configuration protocol (DHCP) server and registering with the CMTS.

The system 152 may also include a CM 140 and a spectrum connectivity platform (SCP) router 142, which are additional CPEs that could be present in a customer's home. The SCP router 142 may include a suite of technologies that enable the routers and additional services.

Figure 2:
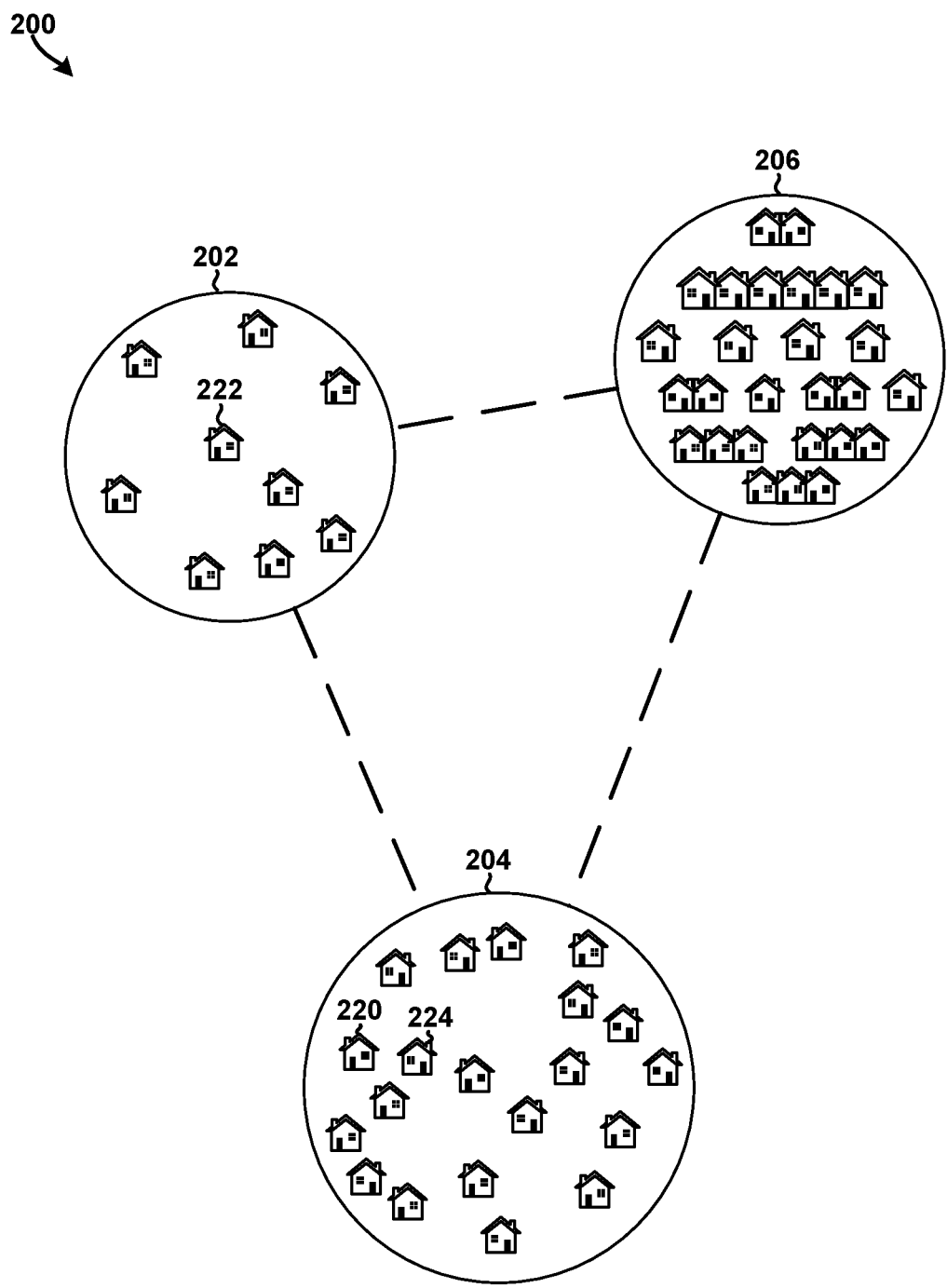
FIG. 2 is a system block diagram that illustrates the differences between inter node and intra node solutions.

FIG. 2 illustrates a service provider network 200 that is divided into nodes 202, 204, 206 that each encompass an area and/or are associated with a headend. Each of the nodes 202, 204, 206 may serve hundreds of individual homes and LANs 101 or thousands of CPEs 106.

The various embodiments include inter-node solutions, intra-node solutions, and combinations thereof. An inter-node solution may use existing data (e.g., DOCSIS data, etc.) to determine whether a CPE that is registered for use in a subscriber premise 220 associated with a node 204 is being used in another subscriber premise 222 associated with a different node 202. However, existing and conventional data are not suitable for use in determining whether a CPE 106 that is registered for use in the subscriber premise 220 is being used in another subscriber premise 224 within the same node 204.

The intra-node solutions disclosed in this application may be used to determine whether a CPE 106 that is registered for use in the subscriber premise 220 is being used in another subscriber premise 224 within the same node 204. A intra-node solution may, for example, activate a radio frequency (RF) radio in a CPE 106a device and broadcast a signal, activate receiver circuitry in other CPE 106b devices registered to the same subscriber or premise, determine the CPE 106b devices were able to receive the broadcast signal, determine various characteristics (e.g., signal strength, signal-to-noise ratio, distortions, degradation in the signal that is indicative of the signal having traveled through walls or a larger distance than could be expected for devices that are in the same home, etc.) of the received broadcast signal, determine various characteristics (e.g., house size, etc.) of the authorized premise or subscriber, and determine a risk score for each of the CPE 106a, 106b, . . . 106x devices based on whether they were able to receive the broadcast signal, the characteristics of the received broadcast signal and/or the characteristics of the authorized premise or subscriber.

For example, the computing system may determine that the authorized premise is a 3000 sq. ft. house, that all the CPEs (106a, 106b, . . . 106x) associated with that premise or subscriber should be able to receive the broadcast signal, and that there is a high probability the CPE devices that are not able to receive the broadcast signal are not located within the same premise as the broadcasting CPE device. In response, the computing system may increment the risk score for those CPEs so that their risk score exceeds a TOS threshold value.

As another example, the computing system may determine that the authorized premise is a 1400 sq. ft. apartment with concrete walls, that all the CPEs (106a, 106b, . . . 106x) associated with that premise or subscriber should be able to receive the broadcast signal with a high signal strength, and that there is a high probability that any CPE that receives the broadcast signal with a signal strength below a certain threshold is in a neighboring house or apartment (and thus not located or used within an authorized premise). The computing system may increment the risk score for those CPE devices accordingly, and determine whether the risk score exceeds TOS threshold value.

As yet another example, the computing system may determine that the authorized premise is a detached home in a rural area, and that there is a high probability that the CPEs that received the broadcast signal with high signal strength are located or being used within the authorized premise. In response, the computing system may decrement the risk score for those CPE devices accordingly.

Figure 3A:
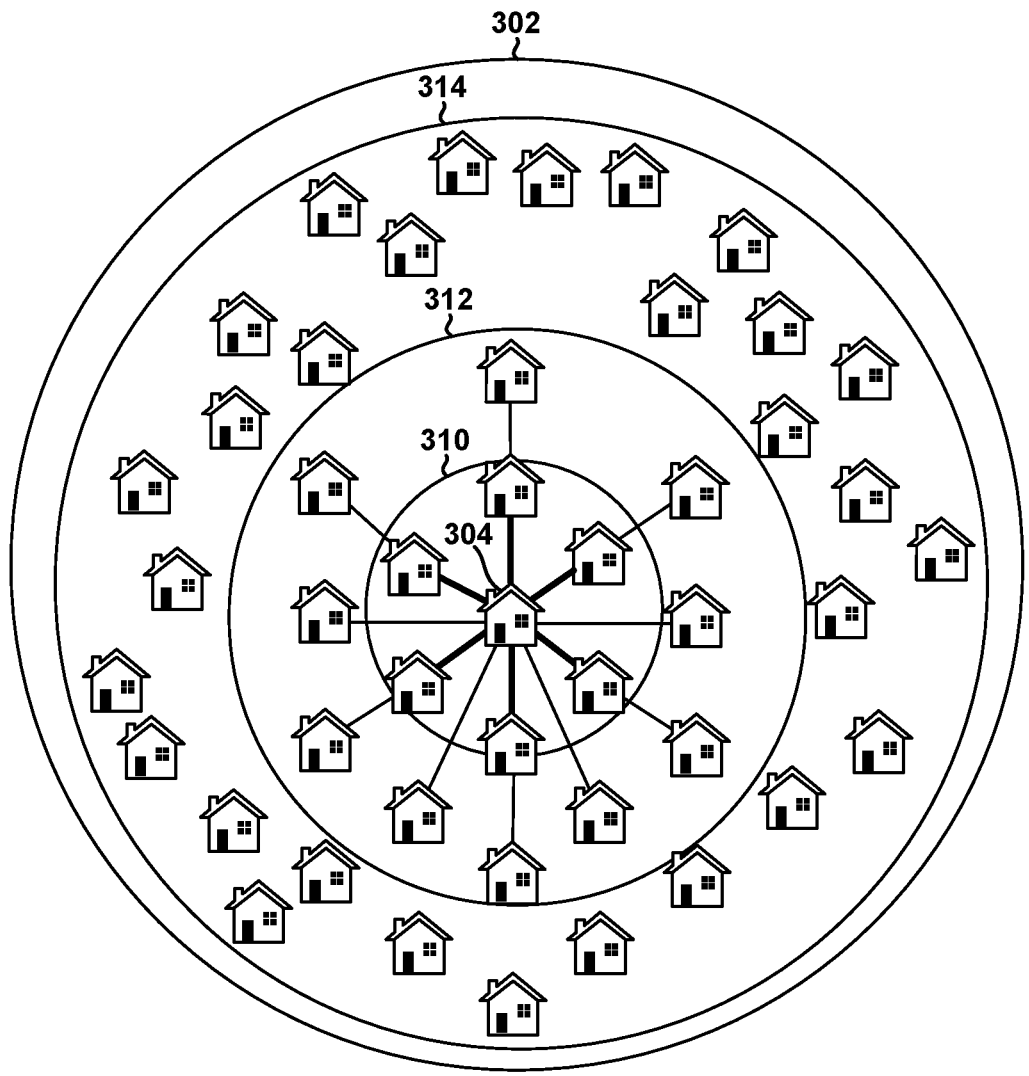
FIGS. 3A-3G are component block diagrams illustrating network nodes in which an authorized subscriber residence is surrounded by other residences in an urban or suburban area suitable for TOS detection in accordance with some embodiments.

FIG. 3A illustrates a network node 302 that includes an authorized subscriber residence 304 surrounded by many other residences in an urban or suburban area. The other residences are located within one of three zones 310, 312, 314.

The residences in the third zone 314 are sufficiently far from the subscriber residence 304 so that a CPE in those residences would not be able to detect an RF broadcast signal from a CPE 106a device in subscriber residence 304. As such, the computing system could readily increment the risk score for those CPE so that their risk score exceeds a TOS threshold value, and take a responsive action (e.g., deactivate the CPE, etc.).

The residences in the first and second zones 310, 312 are sufficiently close to the subscriber residence 304 so that the CPEs in those residences would be able to detect the RF broadcast signal from a CPE 106a device in subscriber residence 304. However, there is a high probability that the CPEs inside the residences that are within the second zone 312 (and outside of the first zone 310) would receive the broadcast signal with a low signal strength (or distorted signal, etc.). As such, the computing system could increment the risk score for those CPE devices accordingly, determine whether their risk scores exceed a TOS threshold value, and take a responsive action as necessary.

The residences in the first zone 310 could be so close to the subscriber residence 304 that the CPEs in those houses receive the broadcast signal with roughly the same or similar characteristics as the CPE (i.e., CPE 106a and 106b) devices within the subscriber residence 304. As such, the above described solution (e.g., activating an RF radio in a CPE device to broadcast a signal, activating receiver circuitry in other CPE devices registered to the same subscriber or premise, determining whether the CPE devices were able to receive the broadcast signal, etc.), alone, may not be able to detect a TOS in those premises.

Figure 3B:
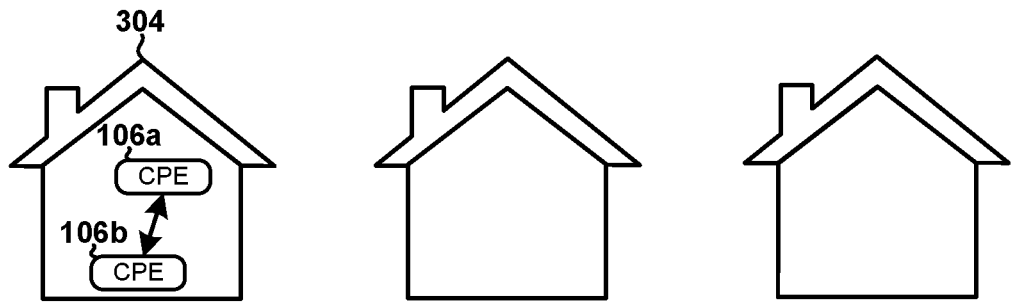

FIG. 3B illustrates an RF broadcast example in which two CPE devices 106a, 106b are included within the same authorized premise 304. As such, there is a high probability that the CPEs 106a, 106b would receive the broadcast signal with high signal strength, and the computing system could determine with a high probably that these devices are not being used for TOS.

Figure 3C:
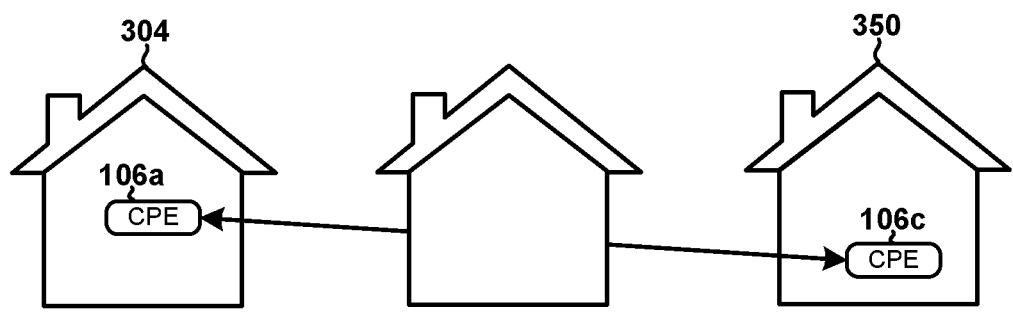

FIG. 3C illustrates an RF broadcast example in which one CPE device 106a is located in an authorized premise 304, and a TOS CPE device 106c is located in another premise 350. The other premise 350 may be sufficiently close to the authorized premise 304 so that CPE 106c could detect the broadcast signal from CPE 106a. However, the other premise 350 may also be sufficiently far from the authorized premise 304 so that the signal received by CPE 106c would have certain telling characteristics, such as low signal strength. As such, the computing system could increment the risk score for those CPE 106c accordingly, determine whether its risk score exceeds a TOS threshold value, and take a responsive action (e.g., deactivate the CPE 106c).

Figure 3D:
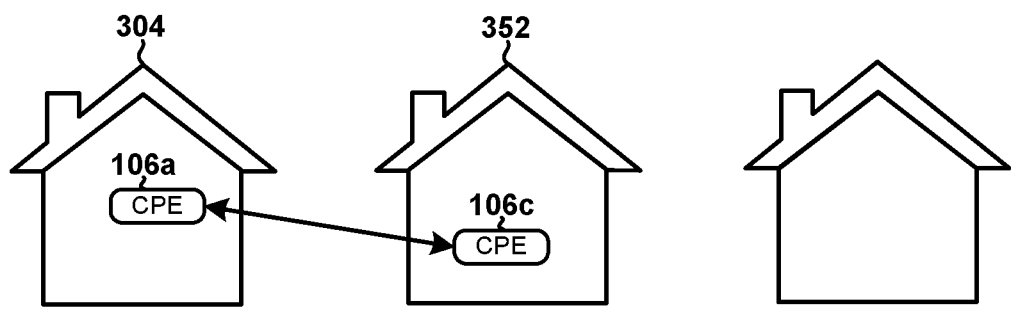

FIG. 3D illustrates an RF broadcast example in which one CPE device 106a is located in an authorized premise 304, and a TOS CPE device 106c may be located in another premise 352. The other premise 352 may be sufficiently close to the authorized premise 304 (e.g., next door neighbor) so that CPE 106c could detect the broadcast signal from CPE 106a without any telling characteristics. As such, the computing system may not be able to determine, based on the RF signal alone, that the CPE 106c is being used for a ToOS.

To address such situations, the computing system may use telemetry points that may be included within the DOCSIS protocol (e.g., a DOCSIS timing offset, etc.) to determine the distances of each of the CPEs 106a, 106b, 106c with respect to the cable modem termination system (CMTS)—the backend. As such, in some embodiments, the computing system may be configured to identify and evaluate differences between the CPEs 106a, 106b, 106c that should be in the same house to determine whether the distances are within a reasonable range of expectations.

As an example, the computing system may be configured to determine a DOCSIS timing offset. That is, the DOCSIS upstream channel, every CM is sharing the same upstream and every modem can send upstream data. To be able to not conflict with each other, there is a mechanism between the CM and the CMTS to determine a "timing offset". The CMTS sends a signal to the CM, the CM sends an ACK as soon as it can, and CMTS determines a timing offset based on how long it took for the signal to come back. Then the CMTS may notify the CM "the next time you want to send something wait x seconds." The end result is that the timing offset is very accurate with a precision of +/−12 meters, which is about the size of a home. Some embodiments may use this timing offset to determine the distances between CPEs registered for use in a subscriber premise and the CMTS.

Figure 3E:
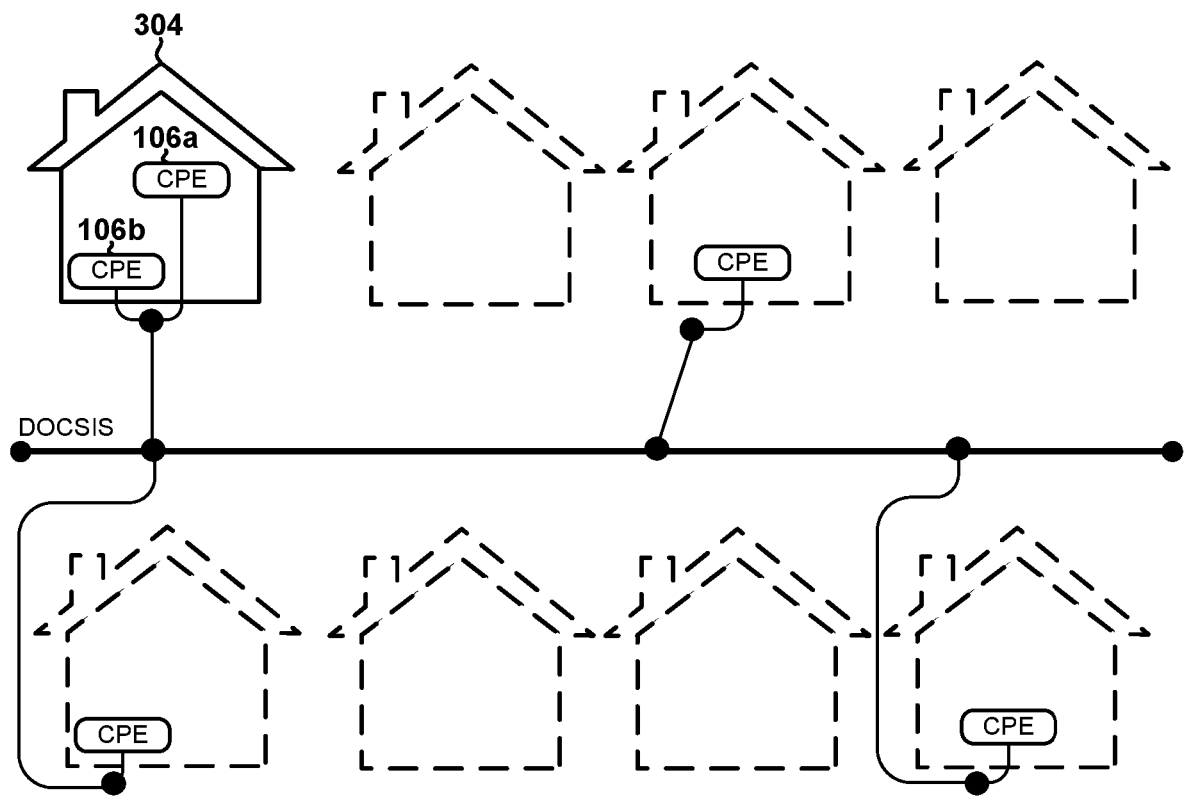

FIG. 3E illustrates a DOCSIS timing offset example in which two CPE devices 106a, 106b are authorized to be used within a premise 304. The computing system may determine the DOCSIS timing offset of CPE devices 106a and 106b, use the DOCSIS timing offset to determine the distances between each of the CPE devices 106a, 106b and the CMTS, and determine that CPE devices 106a and 106b are approximately the same distance from the backend/DOCSIS system. In response, the computing system may determine that the CPE devices 106a, 106b are likely being used within the same premise and not perpetuating a TOS.

Figure 3F:
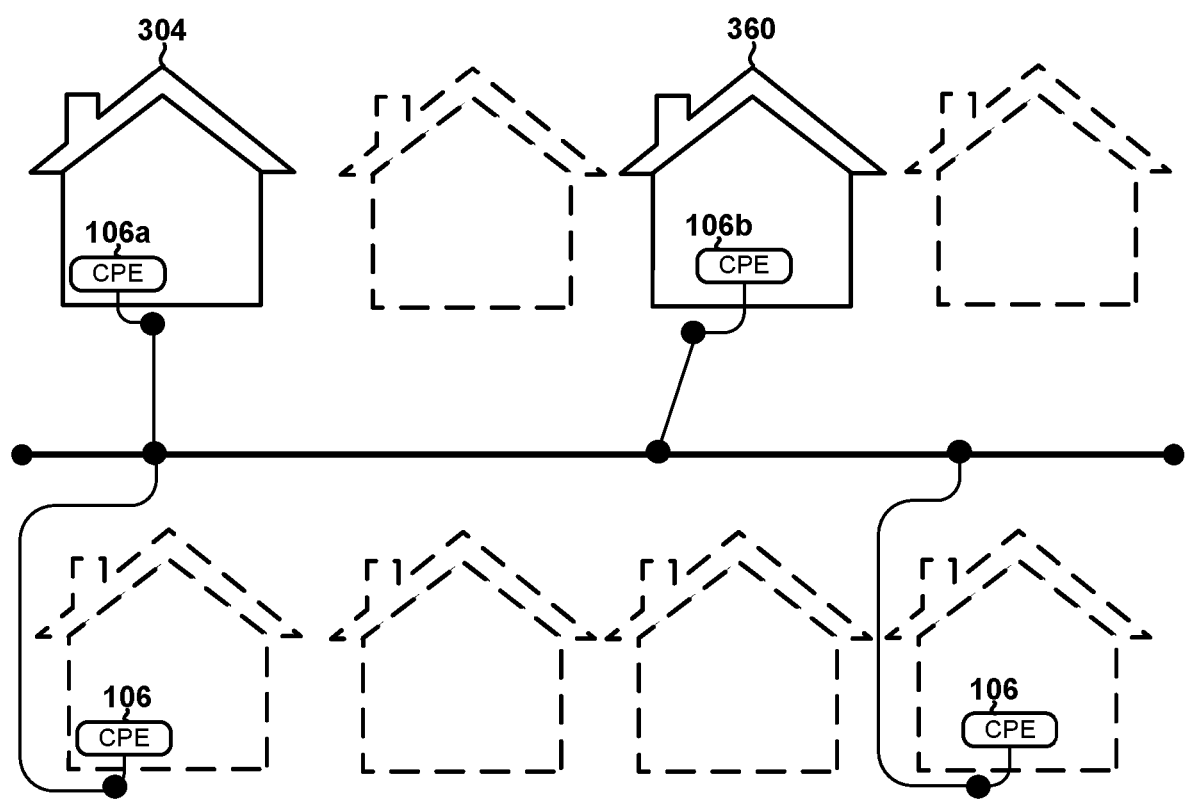

FIG. 3F illustrates a DOCSIS timing offset example in which the two CPE devices 106a, 106b that are authorized to be used in the premise 304 are not being used in the same premise. Rather, CPE device 106b may be located in another premise 360. The other premise 360 may be sufficiently far from the authorized premise 304 so that the difference between the distances of the two CPE devices 106a, 106b and the backend do not fall within a reasonable range of expectations. As such, the computing system could increment the risk score for those CPE 106b accordingly, determine whether its risk score exceeds a TOS threshold value, and take a responsive action (e.g., deactivate the CPE 106b).

Figure 3G:
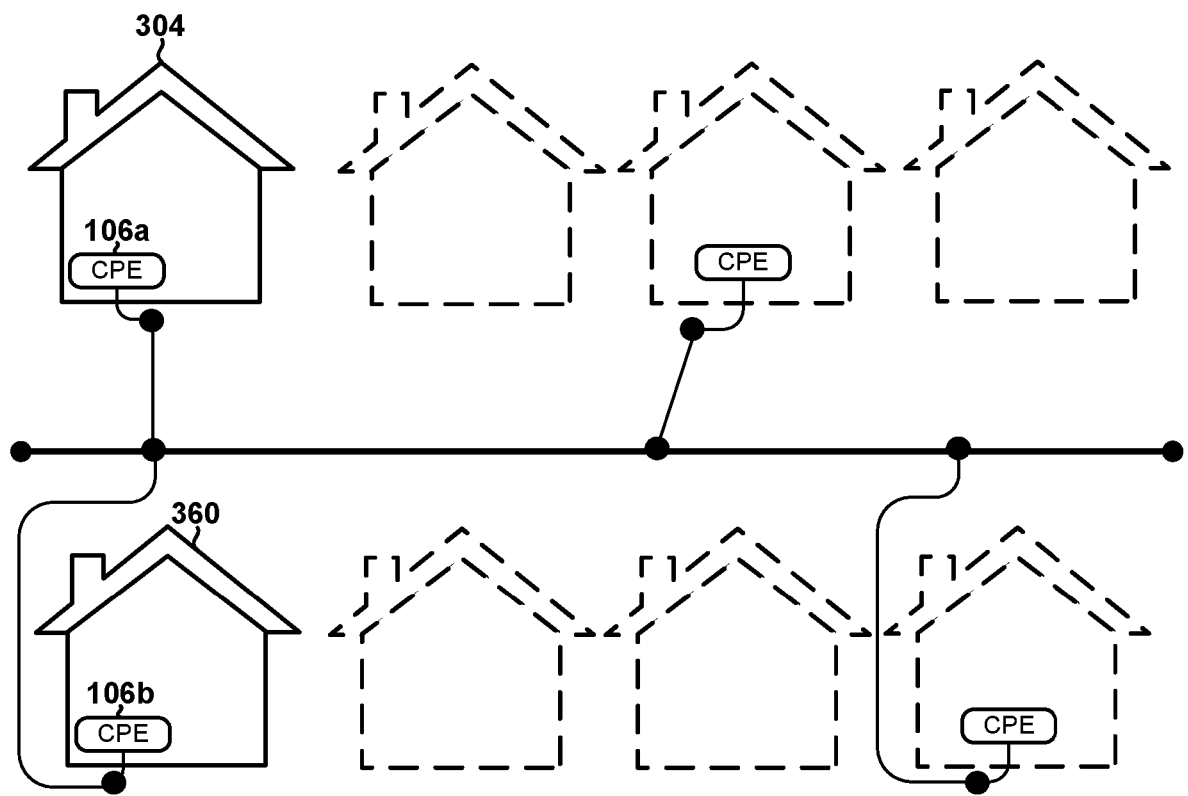

FIG. 3G also illustrates a DOCSIS timing offset example in which the two CPE devices 106a, 106b that are authorized to be used in the premise 304 may not be used in the same premise. However, CPE device 106b may be located in another premise 370 that may be sufficiently close to the authorized premise 304 (e.g., within 200 feet, etc.) so that differences between the distances between the two CPE devices 106a-b and the backend fall within the reasonable range of expectations (e.g., due to the potential for extra cable being used in a house, etc.). As such, similar to the example illustrated in FIG. 3D, the computing system may not be able to determine, based on the DOCSIS offset timing distances alone, that the CPE 106b is being used for a TOS.

To address such situations (e.g., in which the RF radio broadcast and DOCSIS offset timing methods are not conclusive, etc.), in some embodiments the computing system may be configured to use pre-equalizer settings. That is, there are pre-equalizer settings that are impacted by things like micro-reflections, defective amplifiers, defective splitters, extra length in cable, etc. They are also impacted by general RF signals that are randomly in the environment. As such, the impairments in the network will be different for every home. Accordingly, in some embodiments, the computing system may be configured to evaluate pre-equalizer setting in conjunction with other factors to identify correlations, overlaps and/or differences in some of the phenomena or impacts that are occurring in the pre-equalizer settings. Based on this and other analysis, the computing system may develop a more wholistic model for determining the probability that the CPE 106a, 106b are being used to perpetuate a TOS.

Figure 4:
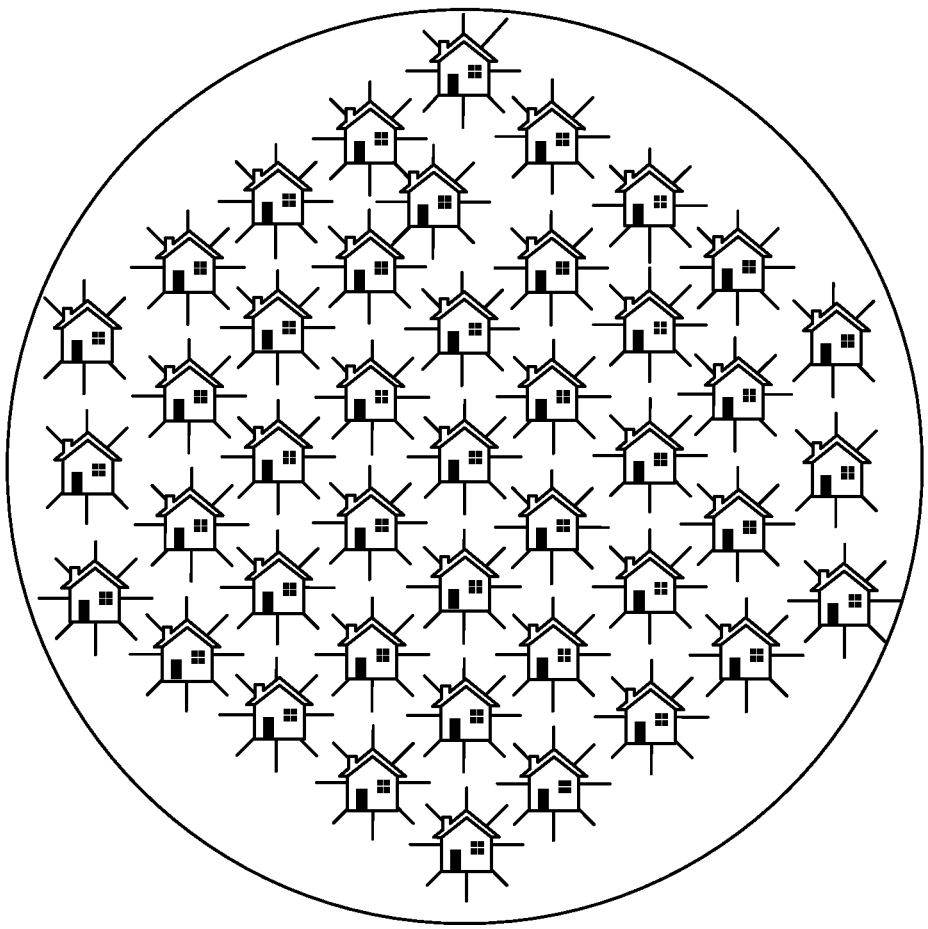
FIG. 4 is a block diagram that illustrates a system that fully eliminates intra-node theft of service through a holistic score that used all data sources.

FIG. 4 illustrates a system that fully eliminates intra-node theft of service through a holistic score that used all data sources. In the example illustrated in FIG. 4, all connections between individual homes are broken.

Figure 5:
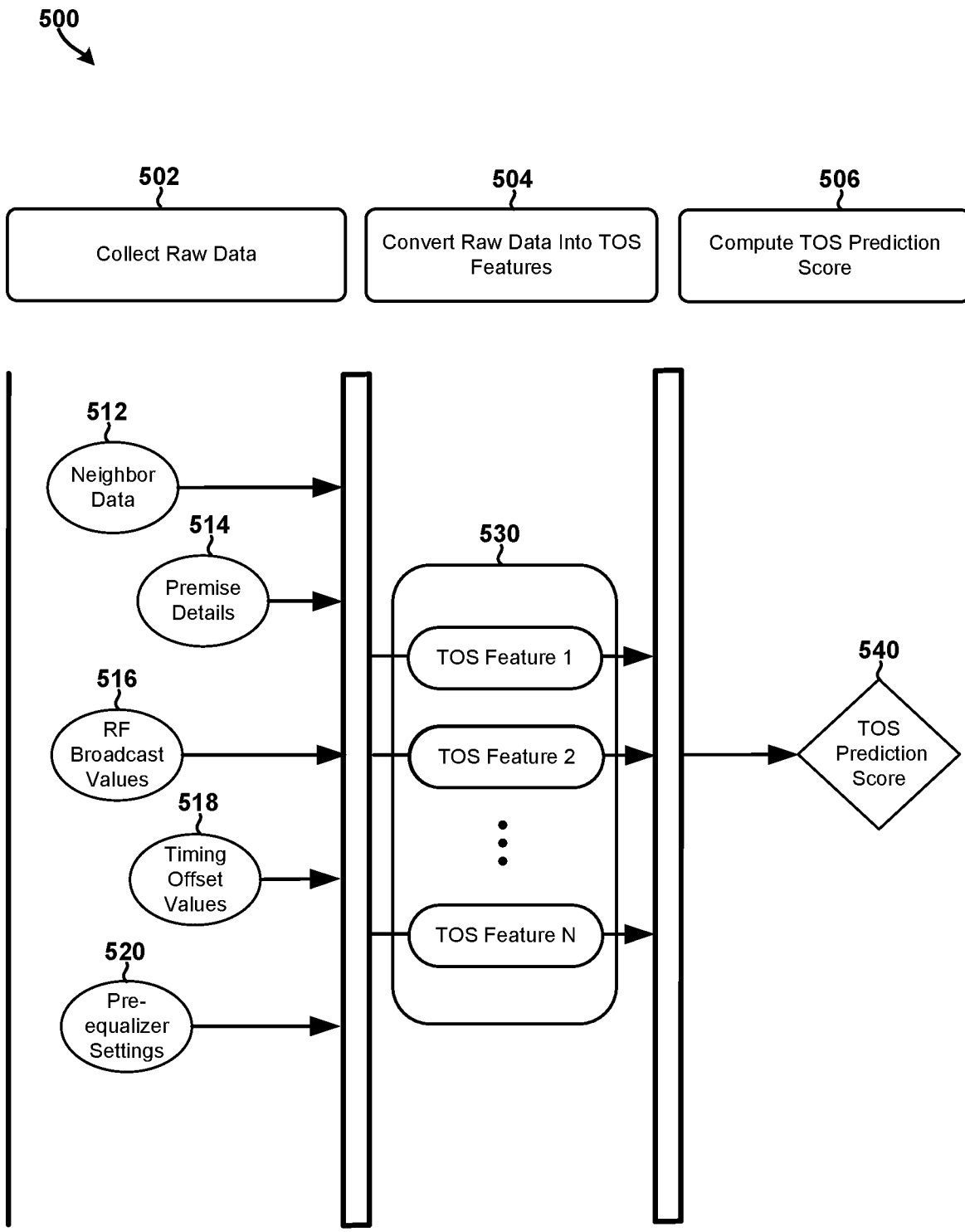
FIG. 5 is an activity diagram that illustrates components, operations and communications in a system configured to generate a TOS score and identify TOS CPE devices in accordance with some embodiments.

FIG. 5 illustrates a method 500 for identifying TOS in accordance with an embodiment. Method 500 may be performed by a processor in a computing system deployed at the customer premise or within the service provider network.

In operation 502, the processor may collect raw data, such as neighbor data 512, premise details 514, RF broadcast values 516, timing offset values 518, and pre-equalizer settings 520.

In operation 504, the processor may convert the raw data into TOS features 530 (TOS features 1-N).

In operation 506, the processor may use the TOS features 530 to compute a TOS prediction score 540. In some embodiments, the TOS prediction score 540 may include a risk score and/or a TOS threshold value suitable for determining whether a CPE device is being used to perpetuate a TOS with a high degree of confidence.

Figure 6:
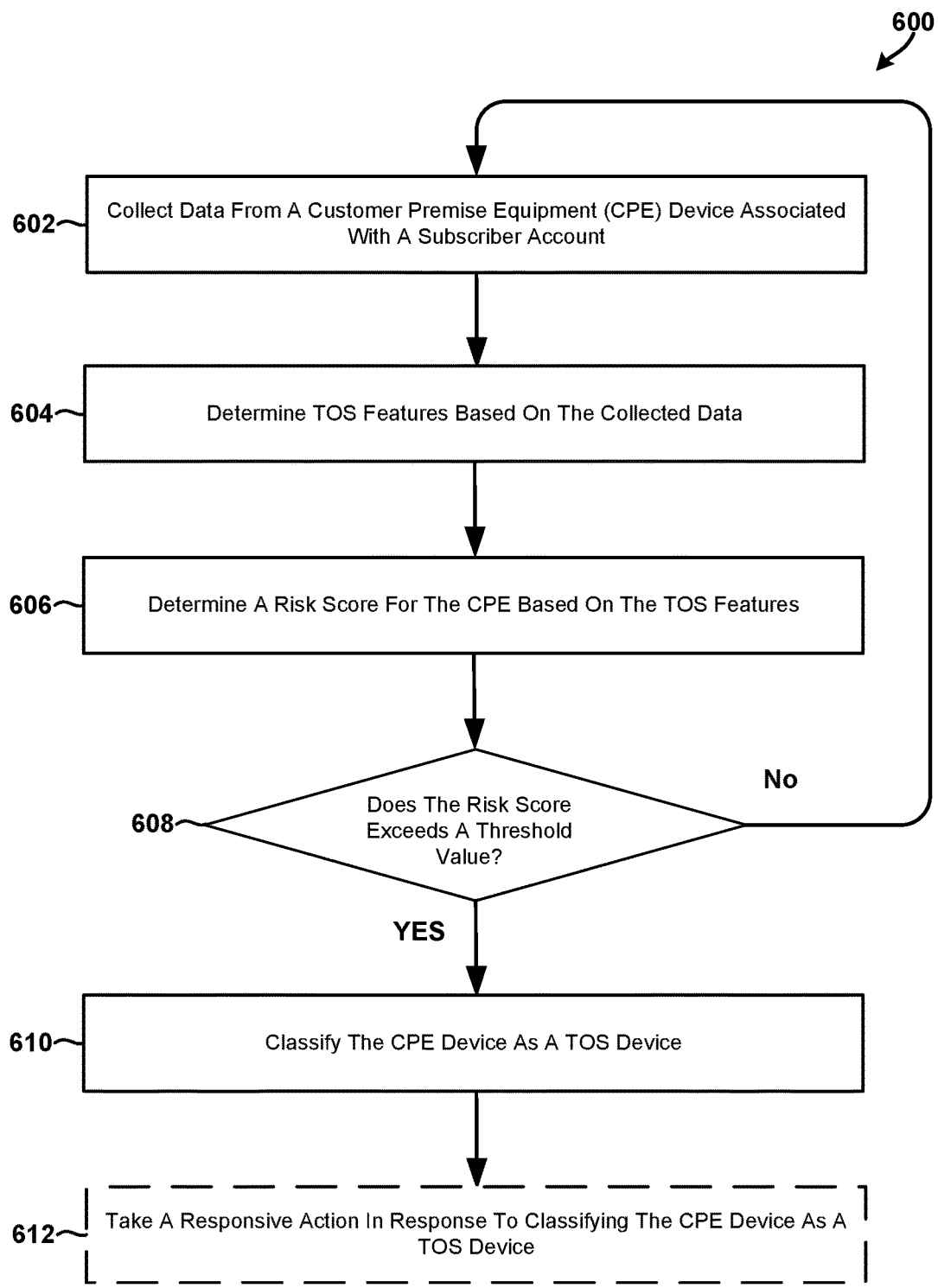
FIG. 6 is a process flow diagram that illustrates a method of identifying TOS CPE devices in accordance with some embodiments.

FIG. 6 illustrates a method 600 of identifying a theft of service (TOS) in accordance with some embodiments. Method 600 may be performed by a processor in a computing device deployed at the customer premise, in the DOCSYS system, in the internet, or in the service provider network.

In block 602, the processor may collect data from a customer premise equipment (CPE) device associated with a subscriber account. For example, in block 602, the processor may collect neighbor data, premise details, RF broadcast values, timing offset values, pre-equalizer settings, etc. In block 604, the processor may determine TOS features based on the collected data. In block 606, the processor may determine a risk score for the CPE based on the TOS features. In determination block 608, the processor may determine whether the risk score exceeds a threshold value. In response to determining that the risk score exceeds the threshold value (i.e., determination block 608="YES"), the processor may classify the CPE device as a TOS device in block 610.

In some embodiments, in response to classifying the CPE device as a TOS device, the processor may take a responsive action in block 612. For example, the processor may deactivate the CPE device or send a notification to a subscriber associated with the subscriber account in block 612 in response to classifying the CPE device as a TOS device in block 610.

Figure 7A:
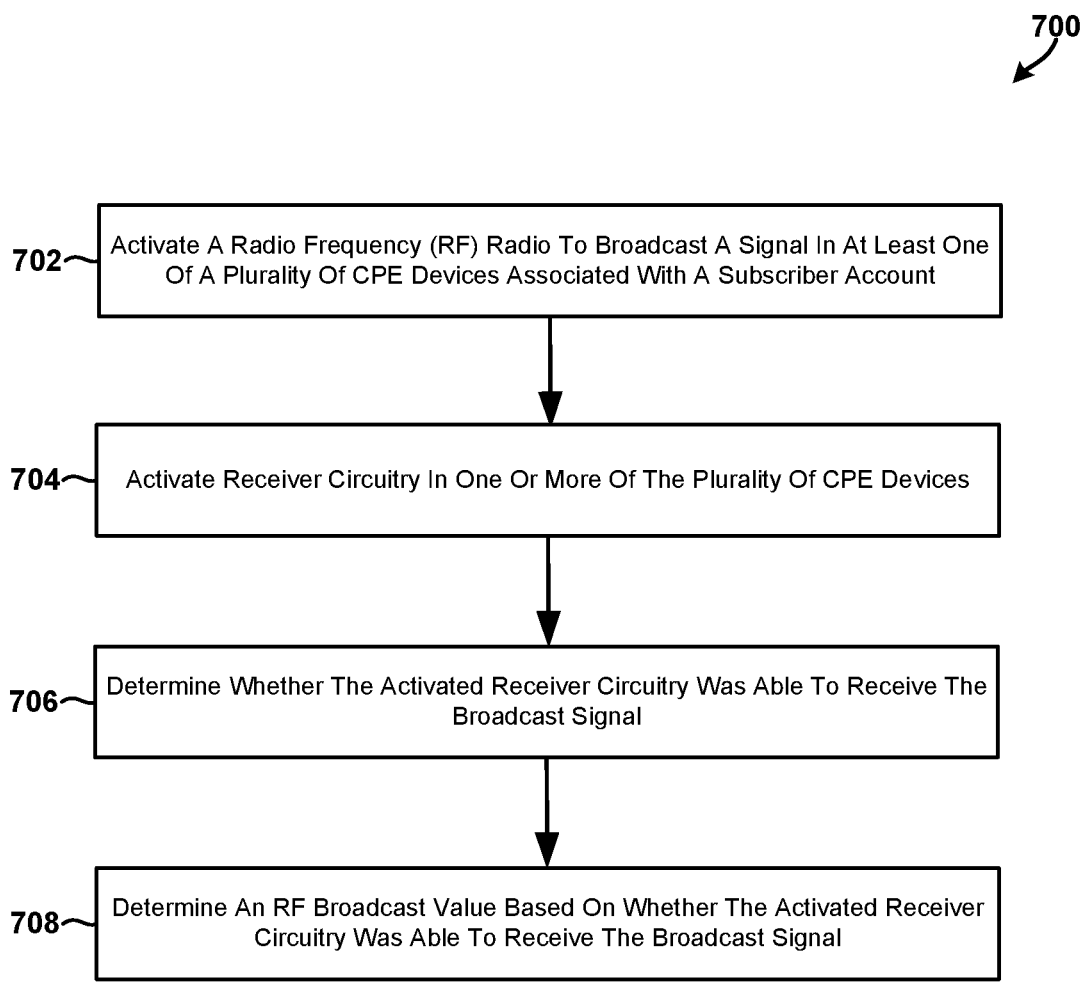
FIGS. 7A and 7B are process flow diagrams that illustrate methods of collecting data from a customer premise equipment (CPE) device associated with a subscriber account in accordance with some embodiments.
Figure 7B:
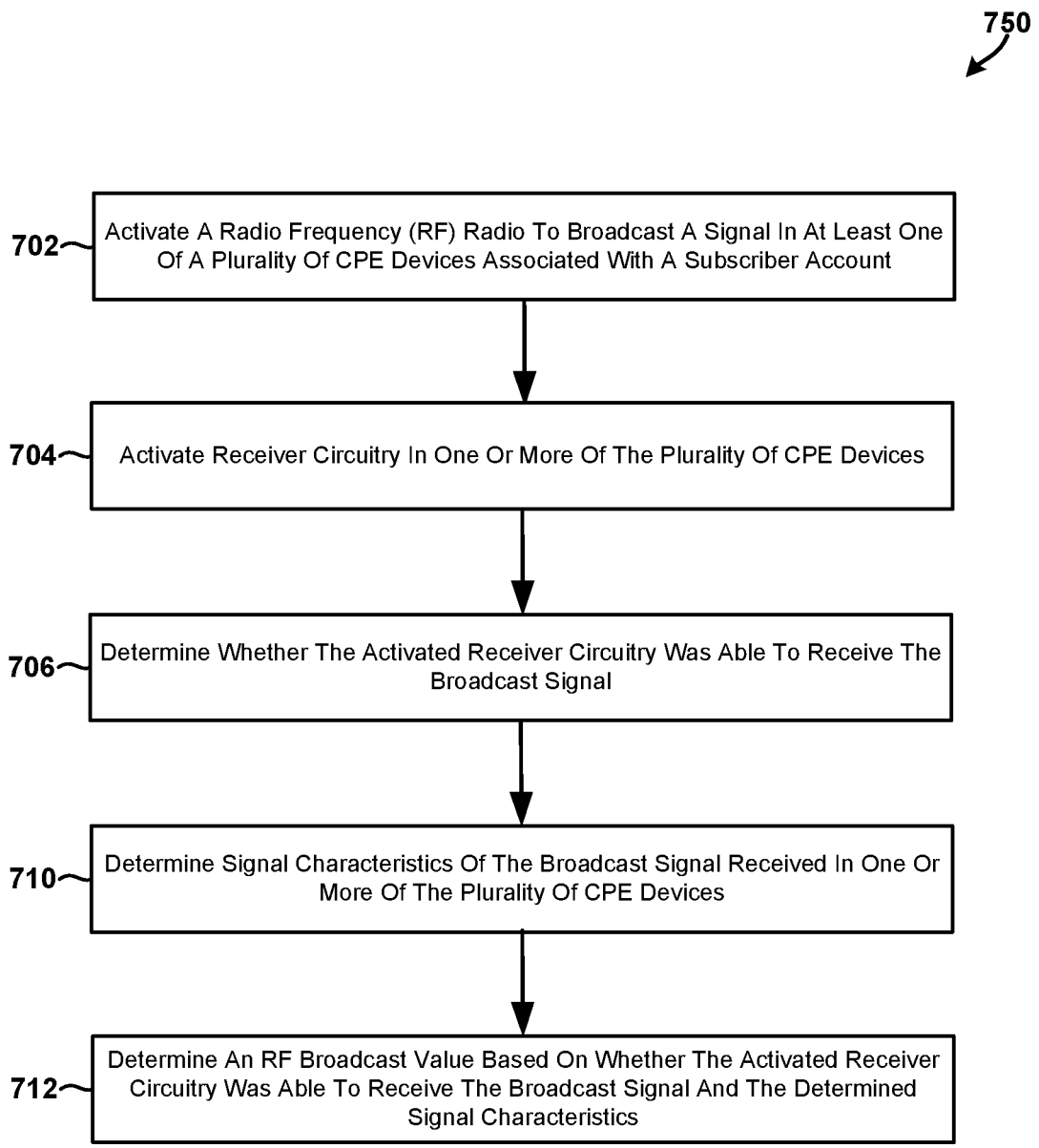

FIGS. 7A and 7B illustrate methods 700, 750 of collecting data from a customer premise equipment (CPE) device associated with a subscriber account in accordance with some embodiments. Methods 700, 750 may be performed by a processor in a computing device deployed at the customer premise, in the DOCSYS system, in the internet, or in the service provider network. In some embodiments, methods 700, 750 may be performed as part of the operations in block 602 (illustrated in FIG. 6).

With reference to FIG. 7A, in block 702 of method 700, the processor may activate a radio frequency (RF) radio to broadcast a signal in at least one of a plurality of CPE devices associated with a subscriber account. In block 704, the processor may activate receiver circuitry in one or more of the plurality of CPE devices. In block 706, the processor may determine whether the activated receiver circuitry was able to receive the broadcast signal. In block 708, the processor may determine an RF broadcast value based on whether the activated receiver circuitry was able to receive the broadcast signal. The processor may then use the RF broadcast value to determine the TOS features (e.g., in block 604 illustrated in FIG. 6) or to perform any or all of the other operations discussed in this application.

In blocks 702-706 of method 750 illustrated in FIG. 7B, the processor may perform the same or similar operations discussed with respect to blocks 702-706 of method 700 illustrated in FIG. 7A. In block 710, the processor may determine signal characteristics of the broadcast signal received in one or more of the plurality of CPE devices (e.g., in response to determining that the activated receiver circuitry was able to receive the broadcast signal, etc.). For example, in block 710, the processor may determine a signal strength of the received broadcast signal, a signal-to-noise ratio of the received broadcast signal, distortions or degradation in the received broadcast signal, etc. In block 712, the processor may determine an RF broadcast value based on whether the activated receiver circuitry was able to receive the broadcast signal and the determined signal characteristics. The processor may then use the RF broadcast value to determine the TOS features (e.g., in block 604 illustrated in FIG. 6) or to perform any or all of the other operations discussed in this application.

Figure 8:
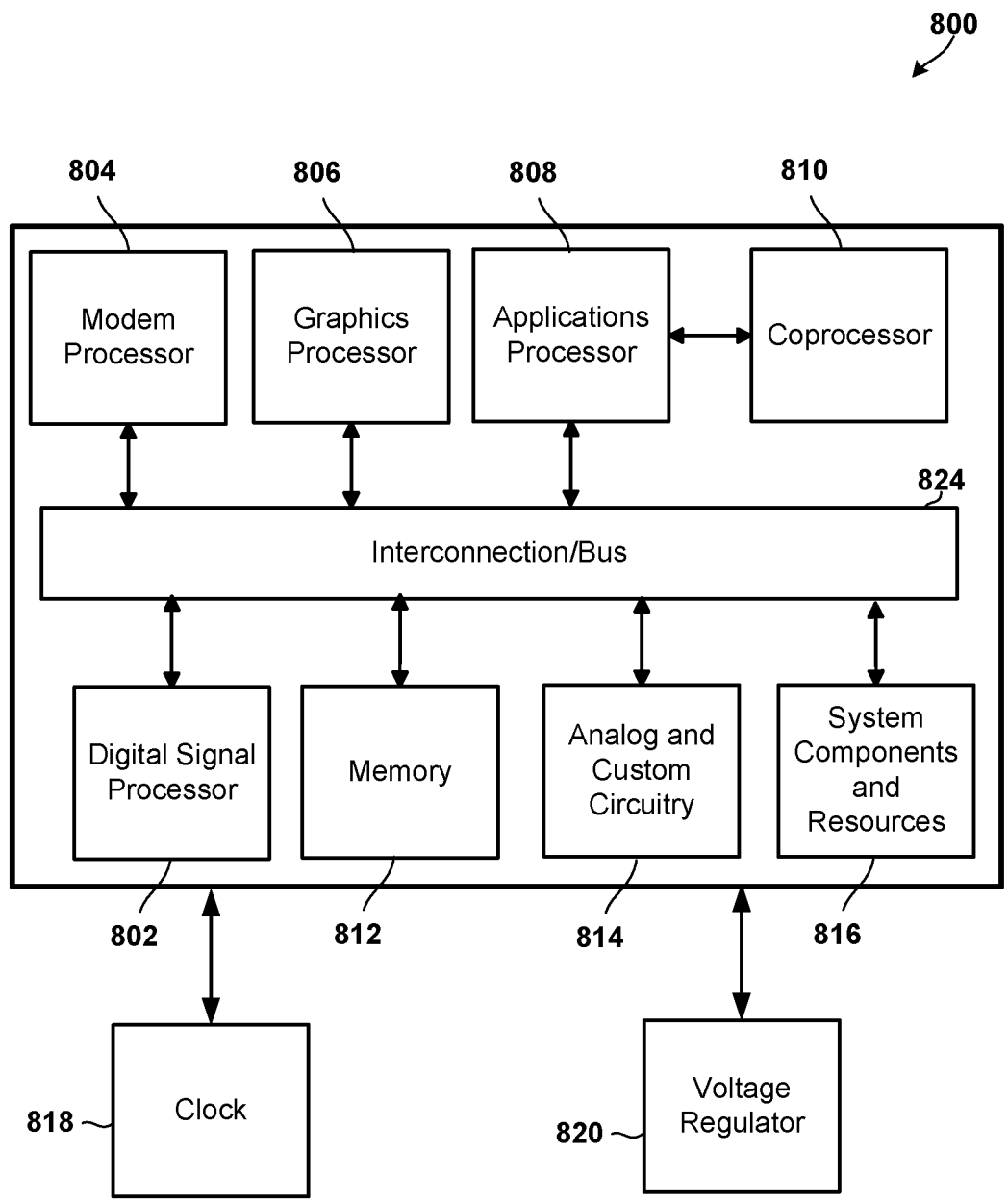
FIG. 8 is an architectural diagram of an example system on chip (SOC) suitable for implementing the various embodiments.

FIG. 8 is an architectural diagram illustrating an example system-on-chip (SOC) 800 architecture that may be used to implement the various embodiments. The SOC 800 may include a number of heterogeneous processors, such as a digital signal processor (DSP) 802, a modem processor 804, a graphics processor 806, and an application processor 808. The SOC 800 may also include one or more coprocessors 810 (e.g., vector co-processor) connected to one or more of the processors 802, 804, 806, 808. Each processor 802, 804, 806, 808, 810 may include one or more cores, and each processor/core may perform operations independent of the other processors/cores. For example, the SOC 800 may include a processor that executes a first type of operating system (e.g., FreeBSD, LINIX, OS X, etc.) and a processor that executes a second type of operating system (e.g., Microsoft Windows, etc.).

The SOC 800 may also include analog circuitry and custom circuitry 814 for managing sensor data, analog-to-digital conversions, wireless data transmissions, and for performing other specialized operations, such as processing encoded audio signals for games and movies. The SOC 800 may further include system components and resources 816, such as voltage regulators, oscillators, phase-locked loops, peripheral bridges, data controllers, memory controllers, system controllers, access ports, timers, and other similar components used to support the processors and clients running on a computing device.

The system components 816 and custom circuitry 814 may include circuitry to interface with peripheral devices, such as cameras, electronic displays, wireless communication devices, external memory chips, etc. The processors 802, 804, 806, 808 may be interconnected to one or more memory elements 812, system components, and resources 816 and custom circuitry 814 via an interconnection/bus module 824, which may include an array of reconfigurable logic gates and/or implement a bus architecture (e.g., CoreConnect, AMBA, etc.). Communications may be provided by advanced interconnects, such as high performance networks-on chip (NoCs).

The SOC 800 may further include an input/output module (not illustrated) for communicating with resources external to the SOC, such as a clock 818 and a voltage regulator 820. Resources external to the SOC (e.g., clock 818, voltage regulator 820) may be shared by two or more of the internal SOC processors/cores (e.g., DSP 802, modem processor 804, graphics processor 806, applications processor 808, etc.).

Figure 9:
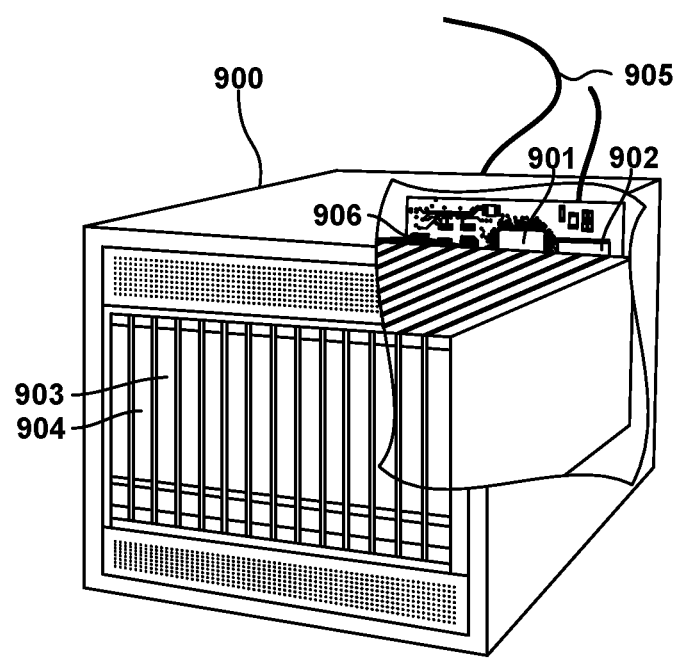
FIG. 9 is a component diagram of an example computing system suitable for implementing the various embodiments.

FIG. 9 illustrate an example server computing system 900 suitable for implementing the various embodiments. Such a computing system 900 typically includes a processor 901 coupled to volatile memory 902 and a large capacity non-volatile memory, such as a disk drive 903. The computing system 900 may also include a floppy disc drive, USB flash drives, memory cards, and optical discs coupled to the processor 901, as well as storage available through local computer networks and cloud storage. The computing system 900 may also include network access ports 904 coupled to the processor 901 for establishing data connections with a network 905, such as a local area network.

In addition to the components illustrated in FIG. 9, the computing system 900 may include system components, analog circuitry, and/or custom circuitry for managing sensor data, wireless data transmissions, performing specialized operations. In addition, the computing system 900 may include a power supply, a voltage regulator, oscillators, phase-locked loops, peripheral bridges, data controllers, memory controllers, system controllers, access ports, timers, and other similar components used to support the processors and software clients (e.g., a web browser) running on a computing device. The computing system 900 also may include an input/output module for communicating with external resources and/or include circuitry to interface with peripheral devices, such as electronic displays, wireless communication devices, external memory chips, etc.

In addition to the computing device discussed above, the various embodiments may be implemented in a wide variety of computing systems, which may include a single processor, multiple processors, multicore processors, or any combination thereof.

The processors (e.g., processor 901) may be any programmable multiprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 906 before they are accessed and loaded into the processor 901.

Each of the processors may include one or more cores, and each processor/core may perform operations independent of the other processors/cores. For example, in some embodiments, the network processor may include a packet processor suitable for processing IP data packets. In some embodiments, the processors may be implemented via an application specific integrated circuits (ASIC). In some embodiments, the processors may be implemented via a customized integrated circuit (IC) (e.g., customized for a particular routing use, etc.).

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of identifying a theft of service (TOS), comprising:
    activating wireless RF radio and receiver circuitry in a first customer premise equipment (CPE) device to broadcast a wireless signal;
    activating wireless RF receiver circuitry in at least one other CPE device to receive the broadcast wireless signal;
    collecting, by a processor of a computing system, data associated with a subscriber account, from the broadcast wireless signal, of the first CPE device, the data comprising radio frequency (RF) broadcast values, and the RF broadcast values are transmitted from the at least one other CPE device to the processor;

determining, by the processor, TOS features of the first CPE device based on the RF broadcast values including at least two of:
a RF timing offset;
a RF signal strength; and
RF signal quality;
determining, by the processor, a risk score for the first CPE device based on the TOS features;
determining, by the processor, whether the risk score exceeds a threshold value;
classifying, by the processor, the first CPE device as a TOS device in response to determining that the risk score exceeds the threshold value; and
deactivating, by the processor, the first CPE device in response to classifying the first CPE device as a TOS device,
determining, by the at least one other CPE device, RF broadcast values of the at least one other CPE device using respective wireless RF receiver circuitry of the at least one other CPE device and transmitting those RF broadcast values to the processor, and determining, by the processor, that fewer than all of the at least one other CPE device received the RF broadcast values from the first CPE device, and increasing the risk score in response to this condition being met, wherein the processor is separate and distinct from the at least one other CPE device.

2. The method of claim 1, wherein collecting data from the first CPE device associated with the subscriber account further comprises collecting:
neighbor data;
premise details;
timing offset values; or
pre-equalizer settings.

3. The method of claim 1, further comprising determining signal characteristics of the broadcast wireless signal received in the at least one other CPE device, wherein determining the RF broadcast value based on whether the activated receiver circuitry was able to receive the broadcast wireless signal further comprises determining the RF broadcast value based on whether the activated receiver circuitry was able to receive the broadcast wireless signal and the determined signal characteristics.

4. The method of claim 3, wherein determining the signal characteristics of the broadcast wireless signal received in the at least one other CPE device comprises determining:
a signal strength of the received broadcast wireless signal;
a signal-to-noise ratio of the received broadcast wireless signal; or
distortions or degradation in the received broadcast wireless signal.

5. A computing device, comprising:
wireless RF radio and receiver circuitry; and
a processor configured with processor-executable software instructions to:
activate the wireless RF radio circuitry in a first premise equipment (CPE) device;
activate wireless RF receiver circuitry in at least one other CPE device to receive the broadcast wireless signal;
collect data from the broadcast wireless signal, via the wireless RF radio and receiver circuitry, associated with a subscriber account of the first CPE device, the data comprising radio frequency (RF) broadcast values determined by the wireless RF radio and receiver circuitry in the at least one other CPE device;
determine theft of service (TOS) features of the first CPE device based on the RF broadcast values including:
a RF timing offset;
a RF signal strength; and
RF signal quality;
determine a risk score for the first CPE device based on the TOS features;
determine whether the risk score exceeds a threshold value;
classify the first CPE device as a TOS device in response to determining that the risk score exceeds the threshold value; and
deactivating, by the processor, the first CPE device in response to classifying the first CPE device as a TOS device,
wherein the at least one other CPE device is configured to determine RF broadcast values of the at least one other CPE device using its respective wireless RF receiver circuitry and transmit the RF broadcast values to the processor, and
wherein the processor is separate and distinct from the at least one other CPE device to determine whether fewer than the at least one other CPE device received the RF broadcast values from the first CPE device, and the risk score is increased in response to this condition being met.

6. The computing device of claim 5, wherein the processor is configured with processor-executable software instructions to collect data from the at least one other CPE device associated with the subscriber account by further collecting:
neighbor data;
premise details;
timing offset values; or
pre-equalizer settings.

7. The computing device of claim 5, wherein the processor is further configured with processor-executable software instructions to determine signal characteristics of the broadcast wireless signal received in the at least one other CPE device, wherein determining the RF broadcast value based on whether the activated receiver circuitry was able to receive the broadcast wireless signal further comprises determining the RF broadcast value based on whether the activated receiver circuitry was able to receive the broadcast wireless signal and the determined signal characteristics.

8. The computing device of claim 7, wherein the processor is configured with processor-executable software instructions to determine the signal characteristics of the broadcast wireless signal received in the at least one other CPE device by determining:
a signal strength of the received broadcast wireless signal;
a signal-to-noise ratio of the received broadcast wireless signal; or
distortions or degradation in the received broadcast wireless signal.

9. A non-transitory computer readable storage medium having stored thereon processor-executable software instructions configured to cause a processor in a computing device to perform operations for identifying a theft of service (TOS), the operations comprising:
activating wireless RF radio circuitry in a first customer premise equipment (CPE) device to broadcast a wireless signal;
activating wireless RF receiver circuitry in the at least one other CPE device to receive the broadcast wireless signal;

collecting data, data associated with a subscriber account, from the broadcast wireless signal, of the first CPE device, the data comprising radio frequency (RF) broadcast values, and the RF broadcast values are transmitted from the at least one other CPE device to the processor;

determining TOS features based on the RF broadcast values including at least two of:
 a RF timing offset;
 a RF signal strength; and
 RF signal quality;

determining a risk score for the first CPE device based on the TOS features;

determining whether the risk score exceeds a threshold value;

classifying the first CPE device as a TOS device in response to determining that the risk score exceeds the threshold value; and deactivating, by the processor, the first CPE device in response to classifying the first CPE device as a TOS device, wherein each of the plurality of the at least one other CPE device determines RF broadcast values of the at least one other CPE device using respective wireless RF receiver circuitry and transmits those values to the processor, and wherein the processor is separate and distinct from the at least one other CPE device to determine whether fewer than the at least one other CPE device received the RF broadcast values from the first CPE device, and the risk score is increased in response to this condition being met.

10. The non-transitory computer readable storage medium of claim 9, wherein the stored processor-executable software instructions are configured to cause the processor to perform operations such that collecting data from the at least one other CPE device associated with the subscriber account comprises further collecting:
 neighbor data;
 premise details;
 timing offset values; or
 pre-equalizer settings.

11. The non-transitory computer readable storage medium of claim 9, wherein the stored processor-executable software instructions are configured to cause the processor to perform operations further comprising determining signal characteristics of the broadcast wireless signal received in the at least one other CPE device, wherein determining the RF broadcast value based on whether the activated receiver circuitry was able to receive the broadcast wireless signal further comprises determining the RF broadcast value based on whether the activated receiver circuitry was able to receive the broadcast wireless signal and the determined signal characteristics.

12. The non-transitory computer readable storage medium of claim 11, wherein the stored processor-executable software instructions are configured to cause the processor to perform operations such that determining the signal characteristics of the broadcast wireless signal received in the at least one other CPE devices device comprises determining:
 a signal strength of the received broadcast wireless signal;
 a signal-to-noise ratio of the received broadcast wireless signal; or
 distortions or degradation in the received broadcast wireless signal.

\* \* \* \* \*